(12) United States Patent
Asakura et al.

(10) Patent No.: US 12,101,016 B2
(45) Date of Patent: Sep. 24, 2024

(54) ELECTRIC MOTOR UNIT

(71) Applicants: NISSAN MOTOR CO., LTD., Yokohama (JP); AMPERE S.A.S, Boulogne-Billancourt (FR)

(72) Inventors: Daisuke Asakura, Kanagawa (JP); Karim Mikati, Kanagawa (JP)

(73) Assignees: NISSAN MOTOR CO., LTD., Yokohama (JP); AMPERE S.A.S., Boulogne-Billancourt (FR)

( * ) Notice: Subject to any disclaimer, the term of this patent is extended or adjusted under 35 U.S.C. 154(b) by 246 days.

(21) Appl. No.: 17/790,073

(22) PCT Filed: Dec. 30, 2019

(86) PCT No.: PCT/IB2019/001415
§ 371 (c)(1),
(2) Date: Jun. 29, 2022

(87) PCT Pub. No.: WO2021/136952
PCT Pub. Date: Jul. 8, 2021

(65) Prior Publication Data
US 2023/0058881 A1     Feb. 23, 2023

(51) Int. Cl.
*H02K 9/19*         (2006.01)

(52) U.S. Cl.
CPC ........... *H02K 9/19* (2013.01); *H02K 2205/09* (2013.01)

(58) Field of Classification Search
CPC ...... H02K 2205/09; H02K 9/19; H02K 9/193; H02K 9/197; Y02T 10/64
See application file for complete search history.

(56) References Cited

U.S. PATENT DOCUMENTS

| | | | | |
|---|---|---|---|---|
| 2011/0012448 A1* | 1/2011 | Tanaka | ...................... | H02K 5/18 310/54 |
| 2013/0334912 A1* | 12/2013 | Tokunaga | ................ | H02K 9/19 310/54 |
| 2014/0346905 A1* | 11/2014 | Matsui | ...................... | H02K 9/19 310/54 |
| 2015/0108857 A1* | 4/2015 | Takahashi | ................ | H02K 9/19 310/208 |

FOREIGN PATENT DOCUMENTS

| | | |
|---|---|---|
| JP | S57-186660 U | 11/1982 |
| JP | 2007-116807 A | 5/2007 |
| JP | 2010-220356 A | 9/2010 |
| JP | 2015-130719 A | 7/2015 |
| JP | 2017-125536 A | 7/2017 |

* cited by examiner

*Primary Examiner* — Naishadh N Desai
(74) *Attorney, Agent, or Firm* — Foley & Lardner LLP

(57) ABSTRACT

An electric motor unit includes: a case; a stator accommodated in the case; a rotor that is rotatably held inside the stator; a rotation shaft that is provided in the rotor and is rotatably supported by the case; a cooling device configured to inject a cooling liquid toward the stator; a gas passage that has a respiratory membrane that allows air to pass through and penetrates from an inner wall surface to an outer wall surface of the case; and a predetermined electrical component arranged between an injection port of the cooling device and an inner wall surface side opening of the gas passage. The gas passage is opened at the inner wall surface of a wall portion on one side of the case in an axial direction.

8 Claims, 8 Drawing Sheets

ELECTRIC MOTOR UNIT

TECHNICAL FIELD

The present invention relates to an electric motor unit.

BACKGROUND ART

It is known to provide a respiratory membrane made of a synthetic resin such as PTFE in a waterproof box-shaped case used for a device such as an electric motor or a transmission in order to alleviate a pressure difference between inside and outside the case. Further, it is also known to use a cooling liquid to cool the parts accommodated in the case.

By the way, when cooling with a cooling liquid, there is a problem that the air permeability of the respiratory membrane is lowered and the pressure difference cannot be alleviated if the respiratory membrane is impregnated with the cooling liquid. JP 2017-125536A discloses a configuration in which the opening of the passage communicating with the respiratory membrane is covered with a cover formed of a member separate from the case in order to prevent the cooling liquid from adhering to the respiratory membrane.

SUMMARY OF INVENTION

However, in the configuration described in the aforementioned document, there is a problem that the number of parts increases and the cost increases due to the cover being formed of a separate member, and further, there is a problem that it is unavoidable to increase the size of the case in order to ensure a space for attaching the cover.

Therefore, it is the object of the present invention to suppress the impregnation of the cooling liquid into the respiratory membrane without causing the aforementioned problems.

According to one aspect of present invention, an electric motor unit includes: a case; a stator accommodated in the case; a rotor which is rotatably held inside the stator; a rotation shaft which is provided in the rotor and is rotatably supported by the case; a cooling device which injects a cooling liquid toward the stator; and a gas passage which has a respiratory membrane that allows air to pass through and penetrates from an inner wall surface to an outer wall surface of the case. The electric motor unit further includes a predetermined electrical component arranged between an injection port of the cooling device and an inner wall surface side opening of the gas passage.

DESCRIPTION OF EMBODIMENTS

Hereinafter, embodiments of the present invention will be described with reference to the drawings.

The First Embodiment

Figure 1:
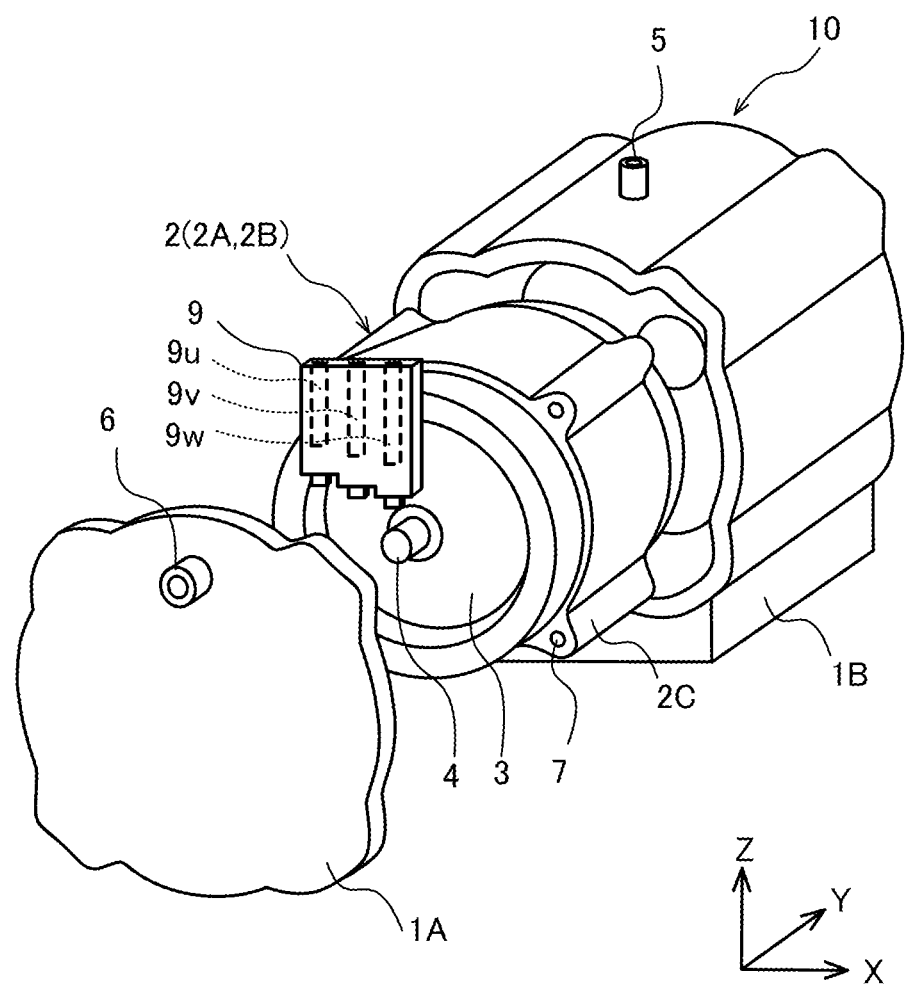
FIG. 1 is an exploded perspective view of an electric motor unit according to a first embodiment.

FIG. 1 is an exploded perspective view of an electric motor unit 10 according to the present embodiment.

The electric motor unit 10 according to the present embodiment is used as a power source of, for example, an electric vehicle or a hybrid vehicle. Regarding the electric motor unit 10, the Z-axis direction in FIG. 1 is the upward direction in the usage state. In the following description, the direction along the X-axis is the left-right direction or the horizontal direction, the direction along the Y-axis is the front-back direction or the axial direction, and the direction along the Z-axis is the up-down direction.

As shown in FIG. 1, the electric motor unit 10 includes a stator 2, a case 1 accommodating the stator 2, a rotation shaft 4 rotatably supported by the case 1, a rotor 3 fixedly supported by the rotation shaft 4, a cooling device 5 that injects a cooling liquid toward the stator 2, and a gas passage 6 for adjusting the pressure in the case 1. Further, a wall surface 1A provided with the gas passage 6 is shown by disassembling one wall surface in the axial direction of the case 1 for the sake of description. Further, a bus bar group 9 shown between the wall surface 1A and the stator 2 is an electric wiring for supplying electric power to the stator 2 from an inverter (not illustrated). Details of the bus bar group 9 will be described later with reference to FIGS. 3 to 5. Further, the bus bar group 9 in the electric motor unit 10 in the disassembled state is configured to penetrate from the outside to the inside of the case 1, but the through-hole through which the bus bar group 9 penetrates in the case 1 is omitted in FIG. 1.

The stator 2 comprises a stator core 2A made of laminated steel plate, a coil (not illustrated) arranged in the slot of the stator core 2A, and a stator holder 2B holding the stator core 2A from the outer peripheral side. Further, in the present description, the stator core 2A, the coil and the stator holder 2B are collectively referred to as the stator 2 unless it is necessary to particularly distinguish therebetween.

The stator holder 2B includes a plurality of bolt holes 7, and the stator 2 is fixed to the case 1 by unillustrated bolts via the plurality of bolt holes 7. Further, the outer periphery of the stator holder 2B of the present embodiment is provided with a protrusion 2C that protrudes in the radial direction of the stator holder 2B and extends from the front end to the rear end of the stator holder 2B, but it is not always necessary to provide the protrusion 2C. The outer periphery of the stator holder 2B is not limited to the illustrated shape, and may be, for example, a cylindrical shape similar to the outer periphery of the stator 2.

The case 1 is formed in a box shape having a space for accommodating an electric motor comprising the stator 2, the rotor 3, and the rotation shaft 4. The case 1 is provided with the cooling device 5 and the gas passage 6, which will be described later. A cooling liquid reservoir 1B is provided at the bottom of the case 1. The cooling liquid reservoir 1B may be formed integrally with the case 1, or may be formed as a separate member and attached to the case 1. Further, the type of the cooling liquid to be used is not particularly limited, but the cooling liquid used in the present embodiment is oil.

The rotation shaft 4 is rotatably supported by the case 1 via a bearing (not illustrated). The rotor 3 is fixedly supported by the rotation shaft 4 by a method such as press fitting, and rotates integrally with the rotation axis 4.

The cooling device 5 is a device for cooling mainly the coil end portion of the stator 2 accommodated in the case 1. The cooling device 5 of the present embodiment is arranged so that an injection port 5a faces the inside of the case at an approximate center in the left-right direction and at an approximate center in the front-back direction on the top surface of the case 1, and supplies the cooling liquid vertically downward from the injection port 5a. Further, the position at an approximate center in the left-right direction and at an approximate center in the front-back direction on the top surface of the case 1 is referred to as the "vertex".

The cooling liquid is pumped up from the cooling liquid reservoir 1B by an oil pump (not illustrated) and fed to the cooling device 5 via a cooling liquid passage (not illustrated). The flow of the cooling liquid supplied from the injection port 5a will be described later.

The gas passage 6 is a ventilation pipe penetrating from the inner wall surface to the outer wall surface of the case 1. The gas passage 6 has a function of alleviating the pressure difference between inside and outside the case 1. More specifically, the gas passage 6 includes a respiratory membrane having a function of allowing air to pass through while not allowing dust or liquid to pass through, and is configured as a pressure adjusting device which is configured to block the passage communicating inside and outside of the case 1 with the unillustrated respiratory membrane when the case 1 is connected to the gas passage 6. Further, the respiratory membrane is a membrane formed of a synthetic resin (for example, Poly Tetra Fluoro Ethylene: PTFE). Details regarding the arrangement, etc. of the respiratory membrane will be described later with reference to FIG. 7.

Thus, the gas passage 6 is arranged in the case 1 in a manner that a predetermined electrical component is interposed between the opening on the inner wall surface side of the gas passage 6 (hereinafter, this opening is referred to as the inner wall surface side opening 6a) and the injection port 5a. The predetermined electrical component here is not particularly limited, and may be an electric wiring, a connector, etc. for supplying electric power to the stator 2. Further, the electrical component here includes not only the conductive electrical component itself such as an electric wiring, but also a cover member such as a resin covering the electrical component, or a case for accommodating the electrical component, or a clamp member for fixing the electric wiring, etc.

In the present embodiment, the bus bar group 9 is configured as the predetermined electrical component. The bus bar group 9 collectively refers to the flat plate-shaped bus bars 9u, 9v, and 9w for supplying electricity to a stator coil of each phase (for example, U phase, V phase, and W phase) provided in the stator 2. In the bus bar group 9 of the present embodiment, the bus bars 9u, 9v, and 9w are arranged side by side in the horizontal direction with the plane direction orthogonal to the axial direction. As illustrated, the bus bar group 9 of the present embodiment is configured as a bus bar unit 9 in which the bus bars 9u, 9v, and 9w are covered with a resin in order to ensure the insulating property among the electrodes.

Further, it is preferable that the bus bar group 9 is arranged in the horizontal direction in a manner that the bus bars 9u, 9v, and 9w do not overlap each other when viewed from the axial direction. This is because by arranging in the horizontal direction, the width of the bus bar group 9 in the horizontal direction becomes wider, and thus, the function as a barrier against the cooling liquid to be described later can be enhanced. Here, the bus bars 9u, 9v, and 9w may have portions that overlap each other when viewed from the axial direction. Further, as illustrated, the bus bars 9u, 9v, and 9w do not necessarily have to be arranged at positions which coincide with each other in the axial direction, and may be arranged to be offset from each other in the axial direction. The details of the bus bar group 9 and the positional relation between the bus bar group 9 and the inner wall surface side opening 6a will be described later with reference to FIGS. 3 to 5.

Here, with reference to FIG. 2, the flow of the cooling liquid injected from the vertex of the case 1 into the case 1 will be described.

Figure 2:
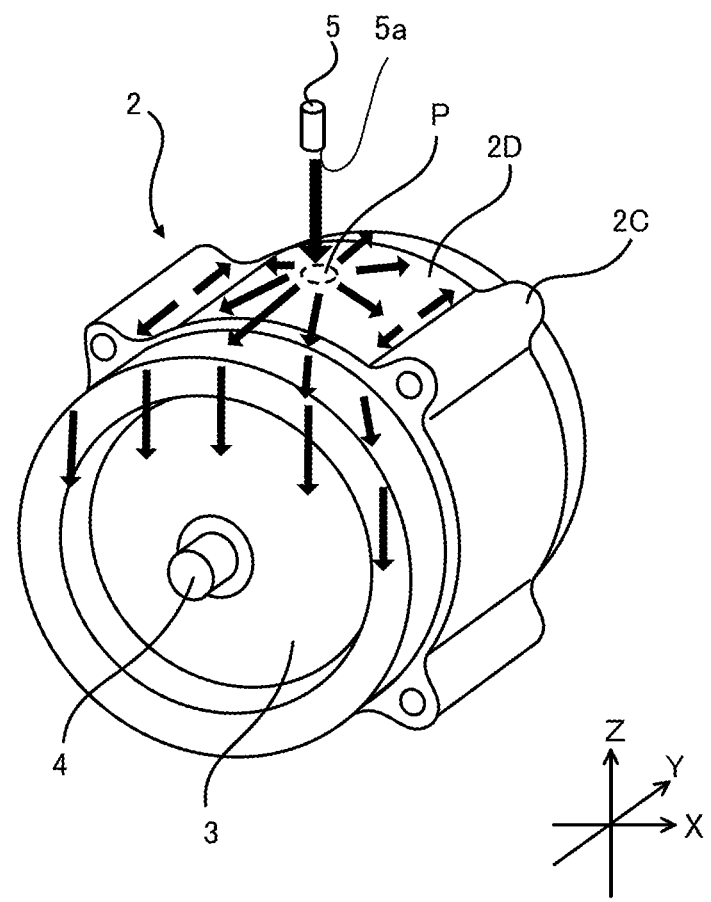
FIG. 2 is a view describing a flow of a cooling liquid.

FIG. 2 is a perspective view of the stator 2, the rotor 3, and the rotation shaft 4. The thick arrows in the figure indicate the flows of the cooling liquid. Further, P in the figure indicates a portion of the top surface 2D of the stator 2 which is hit by the above-mentioned cooling liquid.

The cooling liquid is injected from the injection port 5a of the cooling device 5 arranged in the vertex of the case 1 toward the stator 2, and collides with the portion P of the stator 2 which is hit by the cooling liquid. The cooling liquid that collides with the portion P flows radially in a dispersed manner on the outer peripheral surface of the stator 2, and a part of the cooling liquid reaches each end of the stator 2 in the front-back direction as it is, and cools the coil end that becomes high temperature when operating.

Further, in the present embodiment, the cooling liquid that has collided with the protrusion 2C is accumulated in the reservoir defined by the wall surface on the portion P side of the protrusion 2C and the top surface of the stator 2 before reaching each end of the stator 2 in the left-right direction. Since the reservoir shown by the broken line in FIG. 3 has the ends on the stator 2 in the front-back direction open, the cooling liquid accumulated in the reservoir flows in the front-back direction of the stator 2 along the protrusion 2C to cool the coil end.

The cooling liquid that has cooled the coil end is collected in the cooling liquid reservoir 1B (refer to FIG. 1) below the case 1.

Here, conventionally, when a part of the flow of the cooling liquid approaches the inner wall surface side opening of the gas passage, it might scatter as droplets due to, for example, the vibration of the operating electric motor unit or the vibration of the vehicle and enter the gas passage 6. In addition, the cooling liquid injected from the injection port 5a might become droplets due to the collision with the stator 2 and enter the gas passage 6. Thus, when the cooling liquid enters the gas passage 6 repeatedly, there is a problem that the cooling liquid is accumulated in the gas passage 6 and the air permeability of the respiratory membrane is lowered due to the impregnation of the cooling liquid into the respiratory membrane and the pressure adjusting function by the gas passage 6 is thus lowered.

On the other hand, in the motor unit 10 of the present embodiment, the aforementioned problem is solved by interposing an electrical component (bus bar group 9) between the injection port 5a of the cooling device 5 and the inner wall surface side opening 6a of the gas passage 6. Hereinafter, the positional relation between the bus bar group 9 and the inner wall surface side opening 6a of the present embodiment will be described with reference to FIGS. 3 and 4.

Figure 3:
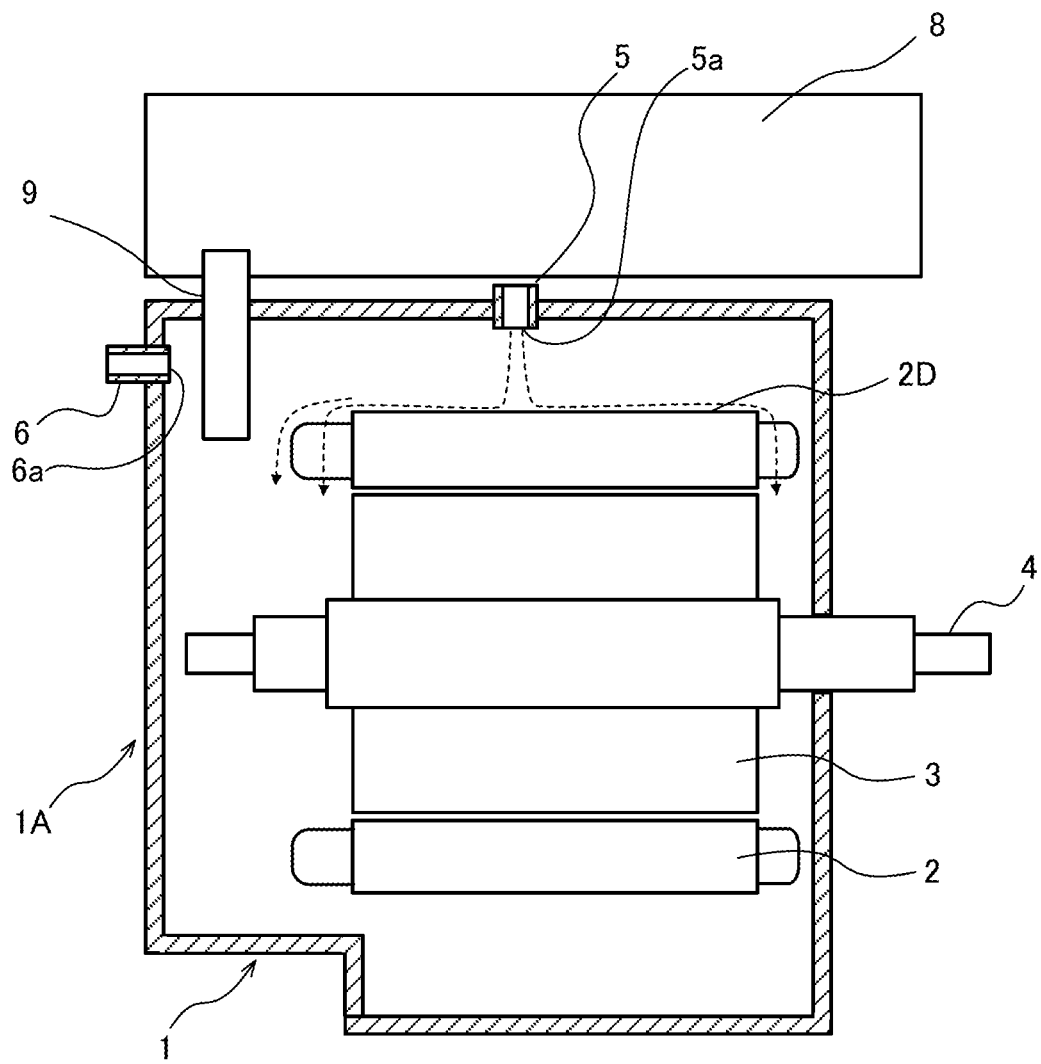
FIG. 3 is a cross-sectional view of the electric motor unit according to the first embodiment as viewed from the horizontal direction.

FIG. 3 is a cross-sectional view of the electric motor unit 10 of the present embodiment shown in FIG. 1 as viewed from the horizontal direction (X-axis direction in FIG. 1). The positional relation among the bus bar group 9, the inner wall surface side opening 6a, and the injection port 5a in the axial direction will be described with reference to FIG. 3. The dotted arrows shown in the figure indicate a part of the flows (oil paths) of the cooling liquid injected into the case 1.

Further, the illustrated inverter case 8 is a case that accommodates an inverter inside, and is arranged above the case 1. Thus, by configuring the bus bar group 9 to project from the inverter case 8 to the inside of the case 1 and connecting it to the coil provided in the stator 2 for each corresponding phase inside the case 1, the inverter and the coil are electrically connected to supply electricity to the stator 2. In addition, the illustration of the wire connection portion between the bus bar group 9 and the coil is omitted.

As shown in FIG. 3, the injection port 5a is arranged on the top surface of the case 1 so as to inject the cooling liquid from the upper side of the case 1 toward the inside of the case 1. The inner wall surface side opening 6a of the gas passage 6 is arranged on the axial end surface (wall surface 1A) on the front side of the case 1. Thus, the bus bar group 9 is arranged inside the case 1 between the injection port 5a and the inner wall surface side opening 6a.

Thus, in the electric motor unit 10 of the present embodiment, by interposing the bus bar group 9 between the inner wall surface side opening 6a of the gas passage 6 and the injection port 5a, the bus bar group 9 functions as a barrier against the flow of the cooling liquid. Thereby, the entry of the cooling liquid into the gas passage 6 is suppressed, and as a result, it is possible to prevent the respiratory membrane from being impregnated with the cooling liquid.

Further, the position of the inner wall surface side opening 6a of the gas passage 6 in the up-down direction is preferably arranged higher than the top surface 2D of the stator 2. By arranging the inner wall surface side opening 6a of the gas passage 6 above the stator 2, it is possible to further reduce the possibility that the cooling liquid flowing across the stator 2 invades the gas passage 6.

Figure 4:
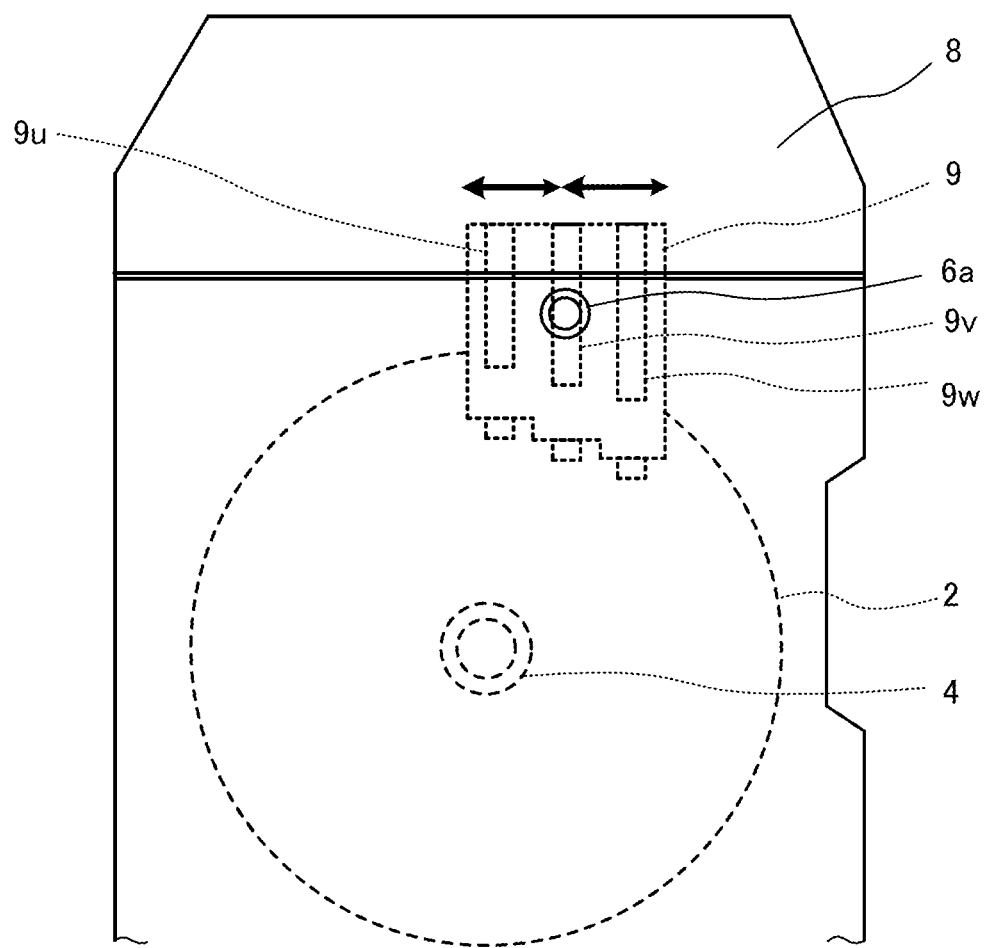
FIG. 4 is a view of the electric motor unit according to the first embodiment as viewed from the rotation axis direction.

FIG. 4 is a schematic configuration diagram of the electric motor unit 10 of the present embodiment as viewed from the axial direction (Y-axis direction of FIG. 1), and is a diagram describing the positional relation between the inner wall surface side opening 6a and the bus bar group 9 in the left-right direction.

As suggested by the two illustrated double-headed arrows, it is preferable that the inner wall surface side opening 6a is configured to be located at the center in the left-right direction of the bus bar group 9 when viewed from the axial direction. By arranging the inner wall surface side opening 6a and the bus bar group 9 in this way, it is possible to further reduce the possibility that the cooling liquid wraps around the bus bar group 9 from the left-right direction and reaches the inner wall surface side opening 6a. In addition, the center here includes the meaning of a substantial center that allows a slight bias to the left or right. Further, the position of the inner wall surface side opening 6a does not necessarily have to be located at the center, and depending on the flow path of the cooling water, the opening may be appropriately arranged at a position where it is possible to further reduce the possibility that the cooling liquid wraps around the bus bar group 9 from the left-right direction and reaches the inner wall surface side opening 6a.

By setting the positional relation between the inner wall surface side opening 6a and the bus bar group 9 in the left-right direction in this way, it is possible to further improve the barrier function of the bus bar group 9 against the flow of the cooling liquid.

Next, the details of the aspect of the bus bar group 9 of the present embodiment will be described with reference to FIG. 5.

Figure 5:
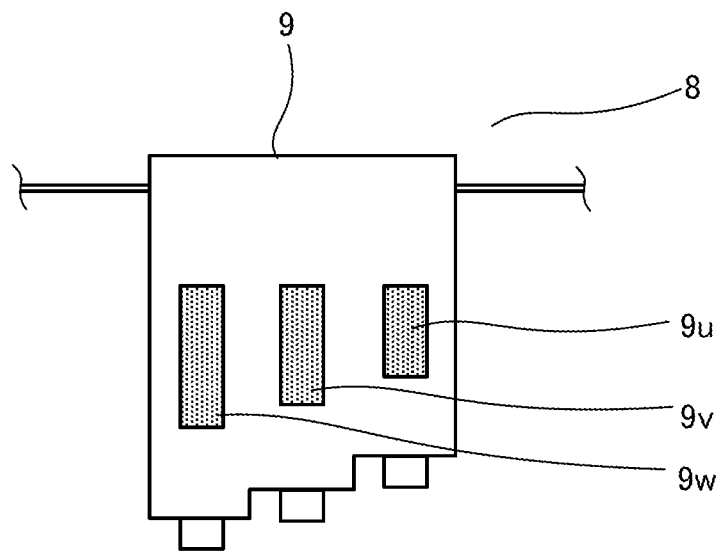
FIG. 5 is a view of a bus bar unit as viewed from the stator side.
Figure 5:
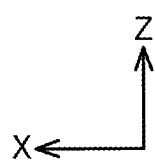

FIG. 5 is a schematic configuration diagram of the bus bar group 9 (bus bar unit 9) in the state of being arranged in the case 1 as viewed from the stator 2 side. As described above, the bus bar unit 9 is configured such that the bus bars 9u, 9v, and 9w are covered with resin. Here, the bus bars 9u, 9v, 9w may be configured to expose at least a part of the surface on the stator 2 side, that is, the surface facing the flow of the cooling liquid. Thereby, the cooling liquid comes into contact with the exposed surface of the bus bars 9u, 9v, 9w, and thus, the cooling liquid can cool the bus bars 9u, 9v, 9w and suppress the heat generation of the bus bars 9u, 9v, 9w.

By the way, the wall surface 1A in the axial direction of the case 1 does not necessarily have to be composed of one member, and may be a structure composed of a plurality of members. For example, the wall surface 1A of the case 1 may have a cover member 1Aa as illustrated in FIG. 6.

Figure 6:
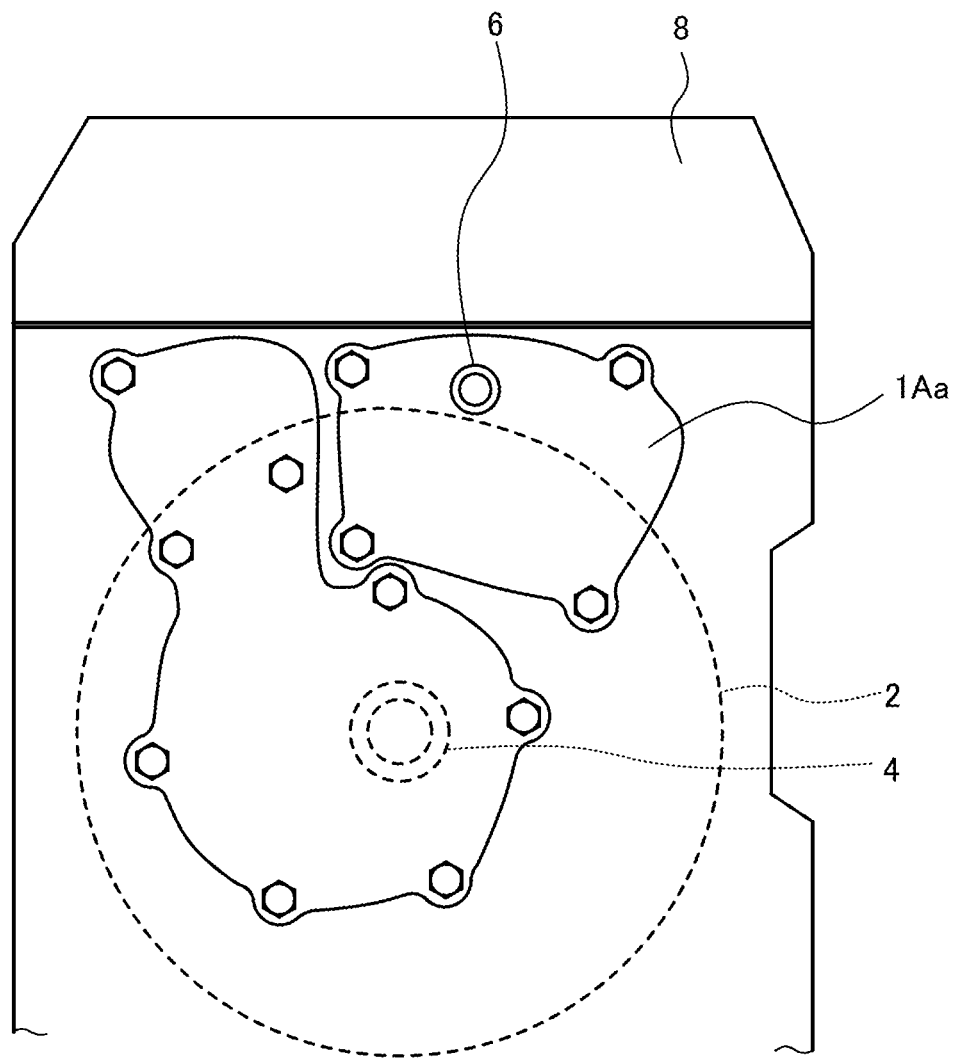
FIG. 6 is a view of the electric motor unit according to the first embodiment as viewed from the rotation axis direction.

FIG. 6 is a view describing the position of the gas passage 6 when the wall surface 1A in the axial direction of the case 1 is composed of a plurality of members. The cover member 1Aa is formed in an arbitrary shape, and is configured to be attachable to and detachable from the wall surface 1A via a bolt, etc. When the cover member 1Aa is removed from the case 1, the portion of the wall surface 1A corresponding to the shape of the cover member 1Aa is opened. This makes it possible to put a hand or insert a tool inside the case 1 through the opened portion, and thus, maintenance, part replacement, etc. of the motor accommodated inside the case 1 can be easily performed without removing the motor from the case 1.

When the wall surface 1A is configured in this way, it is preferable to provide the gas passage 6 in the cover member 1Aa. Thereby, maintenance of the pressure adjusting device including the gas passage 6 can be easily performed by removing the cover member 1Aa from the case 1. Further, the arrangement, shape, and number of the cover member provided on the wall surface 1A are not particularly limited, as the inner wall surface side opening 6a of the gas passage 6 provided in at least one cover member may have a portion that overlaps with the bus bar group 9 when viewed from the axial direction.

Figure 7:
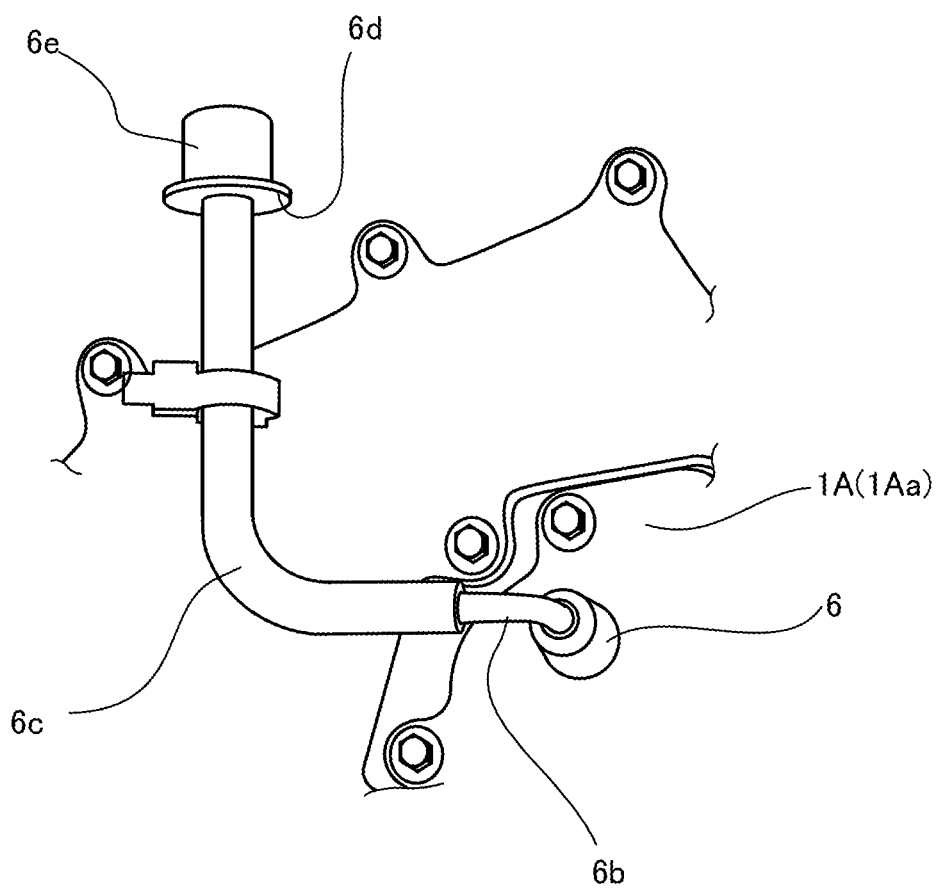
FIG. 7 is a view describing the configuration of a gas passage outside a case.

Next, the configuration of the pressure adjusting device including the gas passage 6 will be described with reference to FIG. 7. FIG. 7 is a view describing a configuration example of the gas passage 6 outside the case 1.

As illustrated, the gas passage 6 outside the case 1 of the present embodiment includes a gas pipe 6b, a hose 6c, an adapter 6d, and a filter 6e.

The gas pipe 6b and the hose 6c are pipes configured to extend the gas passage 6 outside the case 1, and are fixed to the wall surface 1A via a predetermined clamp member, etc. in a manner that the tip on the side opposite to the side connected to the gas passage 6 is located above the position of the gas passage 6 in the up-down direction. In addition, the gas pipe 6b is made of metal and the hose 6c is made of a material such as rubber in the present embodiment, but these materials may be appropriately selected in consideration of durability, cost, etc. Further, the gas pipe 6b and the hose 6c do not necessarily have to be formed separately, and may be formed integrally. Further, the hose 6c does not necessarily have a crank shape as illustrated, and may have a linear shape upward from the position of the gas passage 6.

The filter 6e is a PTFE (respiratory membrane) covered with a general-purpose cover. The filter 6e of the present embodiment is connected to the tip of the rubber hose 6c via the flange-shaped adapter 6d. By arranging the filter 6e in this way, the respiratory membrane is arranged above the gas passage 6, and thus, even if the cooling liquid infiltrates from the inner wall surface side opening 6a of the gas passage 6, the impregnation of the cooling liquid into the respiratory membrane can be more reliably suppressed. Further, as illustrated, by arranging the flange-shaped portion of the adapter 6d to spread in the horizontal direction near the lower portion of the filter 6e, it is possible to prevent the filter 6e from being exposed to water with the flange-shaped portion serving as a barrier even when, for example, rainwater or the like splashes from the road surface.

The above is the details of the configuration of the gas passage 6 outside the case 1. In the present embodiment, as illustrated, the pressure adjusting device comprises the gas passage 6, the inner wall surface side opening 6a, the gas pipe 6b, the hose 6c, the adapter 6d, and the filter 6e. However, the pressure adjusting device does not necessarily have the configuration shown in FIG. 7, and may be changed appropriately as long as it comprises at least the gas passage 6 and the inner wall surface side opening 6a and has a function of alleviating the pressure difference between inside and outside the case 1. For example, the pressure adjusting device may be configured so that the filter 6e is directly connected to the gas passage 6 outside the case 1 without the hose 6c, etc. Further, it is not always necessary to use PTFE, and instead of the filter 6e, for example, a simple cap may be attached to the tip of the hose 6c.

The effects of the electric motor unit 10 of the present embodiment will be described below.

As described above, the electric motor unit 10 of the present embodiment comprises the case 1, the stator 2 accommodated in the case 1, the rotor 3 which is rotatably held inside the stator 2, the rotation shaft 4 which is provided in the rotor 3 and is rotatably supported by the case, the cooling device 5 which injects the cooling liquid toward the stator 2, the gas passage 6 which has the respiratory membrane that allows air to pass through and penetrates from the inner wall surface to the outer wall surface of the case, and the predetermined electrical component arranged between the injection port of the cooling device and the inner wall surface side opening 6a of the gas passage. Thereby, the electrical component interposed between the inner wall surface side opening 6a of the gas passage 6 and the injection port 5a can suppress the entry of the cooling liquid into the gas passage 6 and thus suppress the impregnation of the cooling liquid into the respiratory membrane provided in the gas passage 6. Further, since the electric component originally provided in the case 1 is utilized, the number of parts does not increase and the cost does not increase.

Further, in the present embodiment, the injection port 5a is arranged at a position that becomes the top surface in the usage state of the case 1, and the inner wall surface side opening 6a is arranged on the wall surface 1A orthogonal to the rotation shaft 4 in the usage state of the case 1. By providing the injection port 5a in this way, the coil end of the stator 2 can be cooled using the flow caused by the weight of the cooling liquid. Further, by arranging the inner wall surface side opening 6a on the wall surface 1A orthogonal to the rotation shaft 4 of the case 1, the electrical component can be arranged between the inner wall surface side opening 6a and the injection port 5a without needing to make a significant change in the layout as conventionally.

Further, in the present embodiment, the inner wall surface side opening 6a is arranged at a position higher than the top surface 2D of the stator 2 in the up-down direction in the usage state of the case 1. Thereby, it is possible to further reduce the possibility that the cooling liquid flowing across the stator 2 infiltrates the gas passage 6.

Further, in the present embodiment, the inner wall surface side opening 6a is arranged at a position facing the central portion of the predetermined electrical component (bus bar group 9) in the horizontal direction. Thereby, it is possible to further reduce the possibility that the cooling liquid wraps around the bus bar group 9 from the left-right direction and reaches the inner wall surface side opening 6a.

Further, in the present embodiment, the predetermined electrical component is the bus bars (bus bar group 9) for supplying electric power to the stator. Further, the bus bar group 9 is configured as the bus bar unit 9 to accommodate a plurality of bus bars corresponding to the number of phases of the stator 2, and the bus bar unit 9 is configured to expose at least a part of the surface of the bus bars (9u, 9v, 9w) on the stator side. Thereby, the cooling liquid comes into contact with the exposed surface of the bus bars 9u, 9v, 9w, and thus, the cooling liquid can cool the bus bars 9u, 9v, 9w and thus suppress the heat generation of the bus bars 9u, 9v, 9w.

The Second Embodiment

Figure 8:
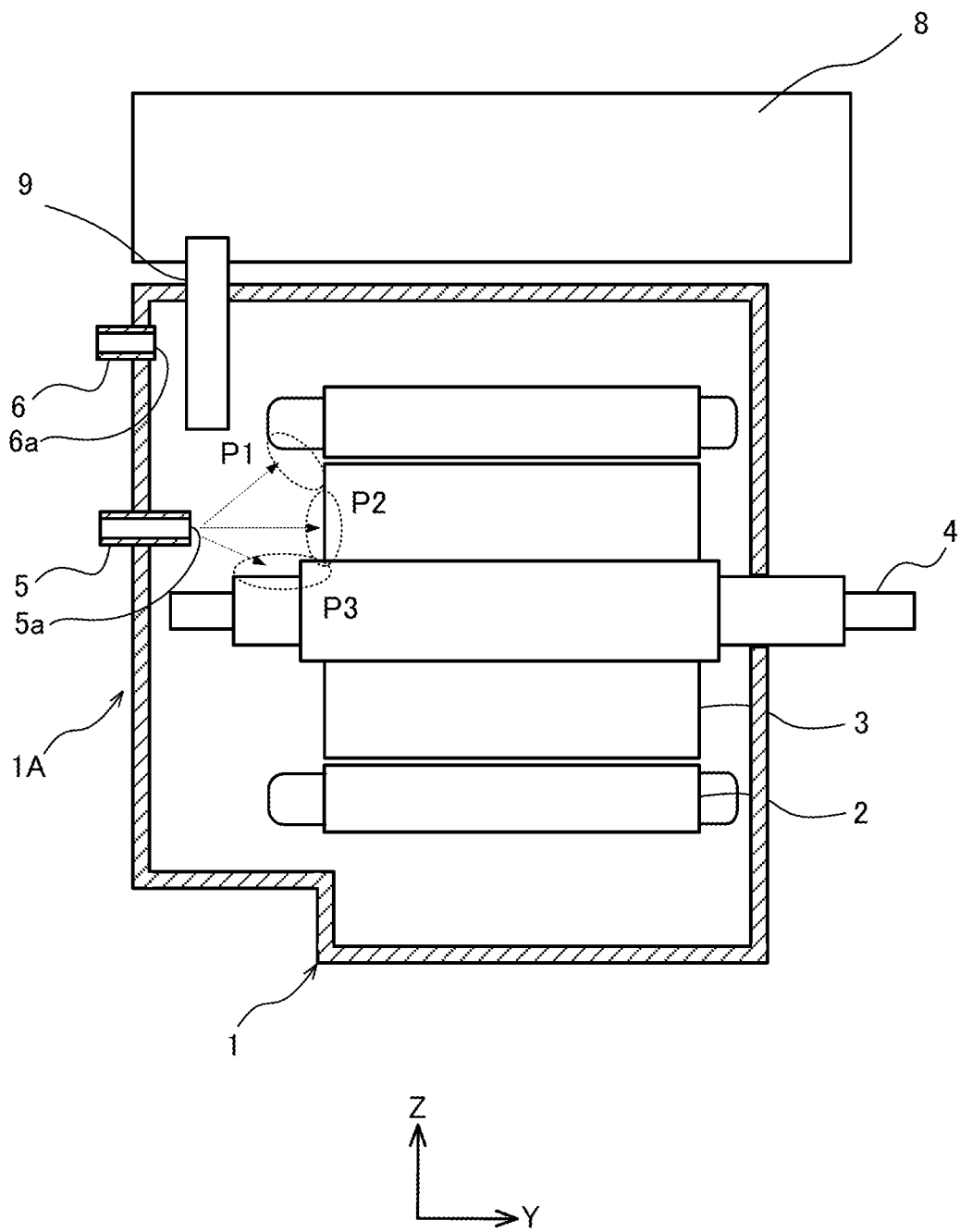
FIG. 8 is a cross-sectional view of an electric motor unit according to a second embodiment as viewed from the horizontal direction.

FIG. 8 is a cross-sectional view of the electric motor unit 20 according to the second embodiment as viewed from the X-axis direction of FIG. 1.

The difference from the electric motor unit 10 according to the first embodiment shown in FIG. 3 is that the injection port 5a of the first embodiment is arranged on the top surface of the case 1, whereas the injection port 5a of the present embodiment is arranged on the axial end face of the case 1. Hereinafter, this difference will be mainly described.

As shown in FIG. 8, the injection port 5a of the present embodiment is arranged on the axial end face of the case 1, and is configured to inject the cooling liquid toward any one or more of the stator 2, the rotor 3, and the rotation shaft 4. The portions where the injected cooling liquid collides with the stator 2, the rotor 3, and the rotation shaft 4 are illustrated as the portions P1, P2, and P3 (refer to the dotted elliptical frames). Thus, the bus bar group 9 of the present embodiment is arranged between any one or more of the portions P1, P2, and P3 and the inner wall surface side opening 6a. With such a configuration, the bus bar group 9 also functions as a barrier against the flow of the cooling liquid, and thus can suppress the entry of the cooling liquid into the gas passage 6. As a result, it is possible to prevent the respiratory membrane from being impregnated with the cooling liquid.

Further, the inner wall surface side opening 6a of the present embodiment is arranged at a position higher than the injection port 5a on the wall surface 1A of the case 1. Thereby, it is possible to further reduce the possibility that the cooling liquid injected from the injection port 5a enters the inner wall surface side opening 6a.

As described above, the electric motor unit 20 of the present embodiment comprises the case 1, the stator 2 accommodated in the case 1, the rotor 3 which is rotatably held inside the stator 2, the rotation shaft 4 which is provided in the rotor 3 and is rotatably supported by the case, the cooling device 5 which injects the cooling liquid toward the stator 2, and the gas passage 6 which has the respiratory membrane that allows air to pass through and penetrates from the inner wall surface to the outer wall surface of the case, and further comprises the predetermined electrical component arranged between the positions where the cooling liquid injected from the cooling device 5 collides (portions P1, P2, P3) and the inner wall surface side opening 6a of the gas passage 6. Thereby, the electrical component interposed between the inner wall surface side opening 6a of the gas passage 6 and the positions where the cooling liquid collides (portions P1, P2, P3) can suppress the entry of the cooling liquid into the gas passage 6 and thus suppress the impregnation of the cooling liquid into the respiratory membrane provided in the gas passage 6.

Further, in the present embodiment, the inner wall surface side opening 6a is arranged above the injection port 5a. Thereby, it is possible to further reduce the possibility that the cooling liquid injected from the injection port 5a enters the inner wall surface side opening 6a.

While the embodiments of the present invention have been described above, the above-described embodiments only show part of application examples of the present invention and are not intended to limit the technical scope of the present invention to the specific configurations of the above-described embodiments.

For example, the layouts shown in the drawings, etc. are examples, and the invention is not limited to the illustrated examples. The layout may be changed as appropriate on the assumption that the electrical component is interposed between the injection port 5a and the inner wall surface side opening 6a or between the inner wall surface side opening 6a and any one of the portions P1, P2, and P3 where the cooling liquid injected from the injection port 5a collides with the motor. For example, the inner wall surface side opening 6a may be arranged on the wall surface in the left-right direction of the case 1 in consideration of the positional relation between the case 1 and the inverter case 8, etc.

The invention claimed is:

1. An electric motor unit comprising:
a case;
a stator accommodated in the case;
a rotor that is rotatably held inside the stator;
a rotation shaft that is provided in the rotor and is rotatably supported by the case;
a cooling device configured to inject a cooling liquid toward the stator;
a gas passage that has a respiratory membrane that allows air to pass through and penetrates from an inner wall surface to an outer wall surface of the case; and
a predetermined electrical component arranged between an injection port of the cooling device and an inner wall surface side opening of the gas passage; wherein:
the gas passage is opened at the inner wall surface of a wall portion on one side of the case in an axial direction; and
the injection port of the cooling device is arranged at a top surface in a usage state of the case, the injection port being arranged such that the cooling liquid injected from the injection port flows radially in a dispersed manner on an outer peripheral surface of the stator.

2. The electric motor unit according to claim 1, wherein: the inner wall surface side opening is arranged on the wall surface of the case which is orthogonal to the rotation shaft in the usage state of the case.

3. The electric motor unit according to claim 1, wherein: the inner wall surface side opening is arranged at a position higher than the top surface of the stator in the up-down direction in the usage state of the case.

4. The electric motor unit according to claim 1, wherein: the inner wall surface side opening is arranged at a position facing a central portion of the predetermined electrical component in the horizontal direction.

5. The electric motor unit according to claim 1, wherein: the predetermined electrical component is bus bars for supplying electric power to the stator.

6. The electric motor unit according to claim 5, further comprising:
a bus bar unit accommodating a plurality of the bus bars corresponding to the number of phases of the stator, wherein the bus bar unit is configured to expose at least a part of the surface of the bus bars on the stator side.

7. An electric motor unit comprising:
a case;
a stator accommodated in the case;
a rotor that is rotatably held inside the stator;
a rotation shaft that is provided in the rotor and is rotatably supported by the case;
a cooling device configured to inject a cooling liquid toward any of the stator, the rotor, and/or the rotation shaft;
a gas passage that has a respiratory membrane that allows air to pass through and penetrates from an inner wall surface to an outer wall surface of the case; and
a predetermined electrical component arranged between positions where the cooling liquid injected from the cooling device collides and an inner wall surface side opening of the gas passage.

8. The electric motor unit according to claim 7, wherein: the inner wall surface side opening is arranged above an injection port of the cooling device in a usage state of the case.

* * * * *